April 25, 1933.                H. R. TRAPHAGEN                1,905,767
                                FERTILIZER BOOT
                              Filed Jan. 8, 1931              2 Sheets-Sheet 1
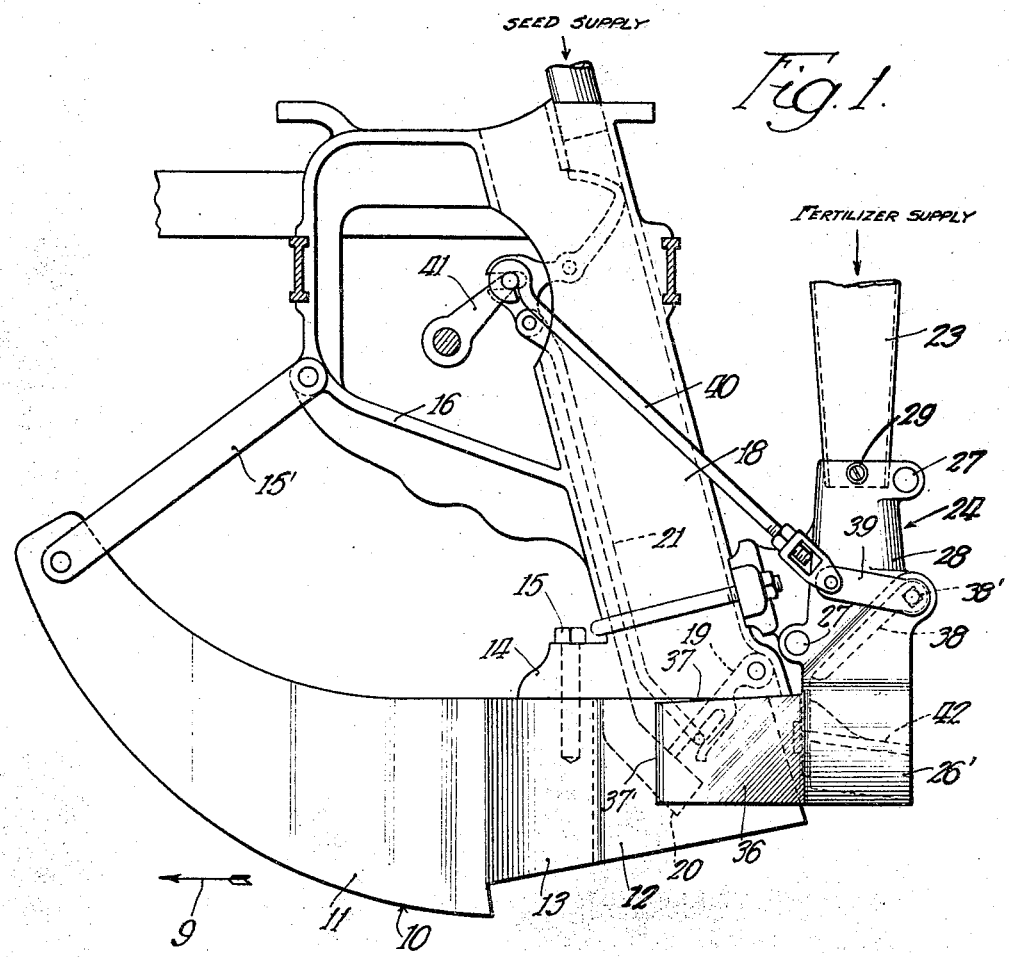
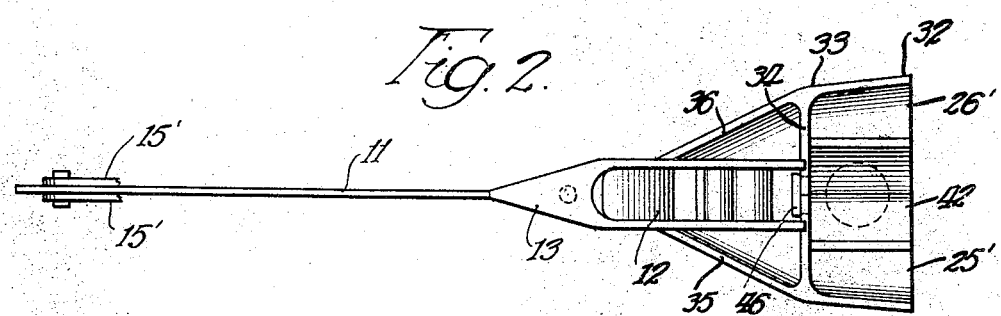
Inventor
Harry Randall Traphagen
By: Fisher, Clapp, Soans & Pond
Attys April 25, 1933.  H. R. TRAPHAGEN  1,905,767
FERTILIZER BOOT
Filed Jan. 8, 1931  2 Sheets-Sheet 2
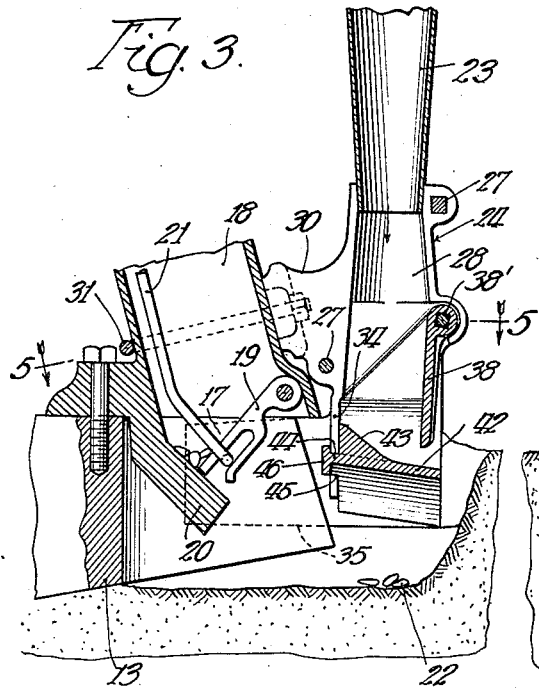
Inventor
Harry Randall Traphagen
By Fisher, Clapp, Soans + Pond
Attys.

Patented Apr. 25, 1933

1,905,767

UNITED STATES PATENT OFFICE

HARRY RANDALL TRAPHAGEN, OF ROCKFORD, ILLINOIS, ASSIGNOR TO J. I. CASE COMPANY, OF RACINE, WISCONSIN, A CORPORATION OF WISCONSIN

FERTILIZER BOOT

Application filed January 8, 1931. Serial No. 507,310.

The invention, although possibly susceptible of other applications, is of particular value in connection with corn planters of the check row type which are fitted with devices for depositing fertilizer adjacent the seed.

In machines of the character referred to, it is considered desirable that the fertilizer shall be deposited reasonably close to the seed or corn kernels so as to avoid wastage of fertilizer and to provide for reasonably complete utilization thereof by the growing corn, while it is also considered a serious detriment to have the raw fertilizer in actual contact with the kernels or seed, the actual contact of fertilizer with the seed apparently having a detrimental effect upon germination.

The principal objects of the invention are to provide an improved type of fertilizer boot in which blowing of the fertilizer away from the immediate vicinity of the seed bed is effectually prevented; to provide an arrangement in which the fertilizer is efficiently distributed in approximately equal amounts on either side of the seed while the latter is being planted or deposited; to provide an arrangement such that when the fertilizer is deposited, it will be almost at once covered by the soil, thereby preventing the fertilizer being blown away after it has been deposited; to provide an arrangement whereby the fertilizer is effectually maintained out of contact with the seeds or kernels; to provide a construction of such character that it will be substantially self-cleaning or self-scouring and will not accumulate dirt or other obstructions which may interfere with its efficient operation; and, in general, to provide an improved arrangement of the character specified.

In the drawings, which disclose a preferred embodiment of my invention:

Fig. 1 is a side elevation of the general arrangement of the boot of a check row corn planter;

Fig. 2 is an underside view of the boot shown in Fig. 1;

Fig. 3 is a vertical section taken longitudinally through the boot shown in Fig. 1;

Fig. 4 is an end elevation taken from the right hand end of Fig. 1;

Fig. 5 is a section taken on the line 5—5 of Fig. 3, and

Fig. 6 is a section taken through the heart of the hill after the passage of the check row planter.

Referring to the drawings, the arrow 9 represents the forward direction of motion of the planter. The planter mechanism disclosed includes a boot or shoe 10 having a blade 11 and a hollow rear extension 12. The front portion 13 of the rear extension is made prow-shaped so as to enter and spread the soil in order to permit the seed to be deposited through the said rear hollow portion 12.

The shoe 10 is supported under a bracket 14 to which it is secured by means of suitable cap screws 15, while the front end of the blade 11 is maintained in position by means of a pair of bars or links 15', the upper ends of which are also secured to a portion of the frame 16 of the planter of which the bracket 14 also forms a part.

As is usual, in corn planters of the check row type, the kernels 17, three or four in number, slightly in advance of the time when it is necessary to deposit the same into the hill, are held or retained at the bottom of the seed duct 18 by means of a valve or latch. In the present instance, said valve or latch arrangement comprises a pivoted gate 19 normally held in inclined position as shown in Fig. 3, with its lower end close enough to the inclined wall extension 20 of the duct 18 to prevent the kernels 17 from passing therebetween. When the usual trip operates, the valve rod 21 moves downwardly opening the gate 19 and permitting the kernels 17 to drop through the hollow portion 12 of the boot to the bottom of the hill as indicated at 22. It will be observed that the depth of the boot 12 is such as to make an opening or seed furrow in the ground about 4 or 5 inches in depth or such other depth as is considered suitable for the particular conditions.

The fertilizer on the other hand should preferably be deposited at a higher elevation on either side of the seeds or kernels so that it will not make contact with the same.

The fertilizer is fed through the vertical spout or duct 23, the lower end of which is seated or received in a fertilizer boot or distributing device 24 which is suitably mounted on the corn planter mechanism or frame. In this instance, the distributor 24 is formed of right and left hand halves 25 and 26 which are united by means of bolts 27 and which co-operate to form a hollow receiving throat part 28. The fertilizer spout 23 enters the upper end of the throat 28 as clearly shown in Figs. 1 and 3, and may be secured therein by means of a set screw 29.

For mounting the distributing device 24 on the corn planter mechanism, it is in this instance provided with a laterally offset bracket portion 30 which fits against the adjacent side of the seed duct 18, as shown in Figs. 1, 3 and 5. A U-bolt, such as indicated at 31, or other suitable means, may be provided for securely fastening the bracket part 30 on the seed duct, as clearly shown in Fig. 5, and it will be understood that the mounting bracket portion 30 is formed of parts integral with the respective right and left hand distributor forming members 25 and 26.

The lower end side portions 25' and 26' of the fertilizer distributing device are diverged downwardly as clearly shown in Figs. 2 and 4. The said flared or diverged sides are diverged to a greater extent at their rear edges 32 than at their forward ends or edges 33, and a transversely extending front wall 34 is formed integral with the flared sides, substantially as shown in Figs. 2 and 4. Prow or plow-shaped extensions 35 and 36 are also formed integral with the respective diverged side walls and these extensions project forwardly from the front end of the same, as best shown in Figs. 1 and 2. These extensions are so shaped that at their upper edges 37 and at their front ends 37', they lie closely adjacent or fit the respective side walls of the hollow seed-receiving portion 12 of the corn planter shoe. The bottom edge of each forward extension extends at an outwardly and rearwardly inclined angle from the plane of the respective side walls of the hollow member 12 to the front end of the respective diverged side portions 25' and 26' and the bottom edges of these parts terminate above the bottom of the seed boot 10.

It will be understood that the downwardly and rearwardly diverging extensions 35 and 36 and side portions 25' and 26' of the fertilizer distributing device serve, when the planter is moved forwardly, to spread the soil to form a fertilizer receiving furrow in a zone disposed above the zone in which the seeds are deposited, as clearly shown in Fig. 4. In so spreading the soil, shelves such as indicated at S are formed on opposite sides of the seed trough and the fertilizer distributing mechanism is arranged to deposit fertilizer on these shelves. Also, the side walls of the auxiliary, fertilizer receiving furrow extend upwardly and inwardly so as to overhang the said shelves. When the fertilizer furrow forming parts are moved forwardly, the said overhanging sides naturally collapse and fill in the furrow, thereby covering both the fertilizer on the shelves and the seeds in the seed furrow.

Intermediate its receiving end and its lower flared end, the distributing device 24 is provided with a valve or gate 38 which is pivotally mounted, as indicated at 38', at the rear of the device. In its closed position, the valve plate 38 extends forwardly and downwardly at an angle, as indicated in broken lines in Fig. 3, and forms a closure for the throat 28 for temporarily retaining a measured quantity of fertilizer therein. The gate 38 is actuated by means of an arm 39 secured to one end of the pivot member 38' on the outside of the distributing device and a connecting rod or link 40 which extends between the outer end of the arm 39 and the rocking mechanism 41 which also actuates the seed valve 19 and its valve rod 21. It will be seen that substantially simultaneously with the opening of the seed valve 19, the fertilizer valve 38 will be swung from its closed position, as indicated in Fig. 1, to its open position, as shown in full lines in Fig. 3.

The rear side of the fertilizer boot, below the pivot mounting 38' of the valve plate 38, is preferably open as shown. This open, rear side construction avoids clogging of the boot inasmuch as the forward movement of the boot through the soil results in a self-cleaning or scouring action. It will be noted that when in its open position, as shown in Fig. 3, the valve or gate 38 serves to close the open rear side of the distributing device so that the fertilizer is not readily blown away or otherwise distributed outside of the desired area, but, on the contrary, is effectively confined so that it will descend in the distributing device so as to be affectively controlled and deposited in the ground as desired.

For spreading the fertilizer to cause the same to be deposited on the shelves S and not in the seed furrow, a spreader 42 is provided, which, in this instance, consists of an inverted V-shaped member having an upwardly projecting dividing fin 43 provided at its forward portion. The spreader 42 may be mounted within the distributing boot in any suitable manner, and in this instance it is illustrated as being mounted in fixed position by means of narrow extensions, as indicated at 44, of the respective walls of the V-shaped spreader, these extensions forming, in effect, a small V which is disposed in a correspondingly shaped opening 45 provided in the front wall portion 34 of the device. An enlarged head 46 formed integral with the extension 44 serves to prevent withdrawal of the spreader from the opening 45. It will, of course, be understood that the V or triangular-shaped opening in the wall 34 is formed partly in each of the two halves of the distributing device, and that the spreader is placed in position before the clamping bolts 27 are adjusted to hold the right and left hand halves of the distributing device in assembled position.

Owing to the forward movement of the planter, there is more or less of a tendency for the descending fertilizer to lag and to engage the spreader towards its rear end. However, in the arrangement described, the fertilizer valve 38 causes the fertilizer to descend at the front of the boot so as to engage the spreader 42 at its front end. Hence, even the comparatively short spreader shown is effective to divide and deposit substantially all of the fertilizer on the shelves at opposite sides of the seed furrow without depositing any in the seed furrow.

I am aware that modifications of the above described structure may be made without departing from the spirit of my invention, the scope of which should be determined by reference to the following claims, which should be construed as broadly as possible consistent with the state of the art.

I claim as my invention:

1. In a device of the class described, the combination of a seed planter shoe having a portion for forming a seed-receiving furrow, and a fertilizer-receiving, furrow-forming device including a pair of side members diverging rearwardly and downwardly and having their lower edges elevated above the bottom of said shoe and their front edges fitting said shoe, said side members being arranged to materially widen the seed furrow and form lateral shoulders above the bottom thereof without materially increasing the width of the same at its top, thereby forming inwardly and upwardly inclined side walls in the fertilizer-receiving furrow, which walls normally collapse to fill in the furrow when said device is moved away, a single fertilizer container, and means for dividing fertilizer from said container into two portions and conducting said portions to said shoulders.

2. In a device of the class described, the combination of a seed-planting mechanism including a shoe for forming a seed-receiving furrow, said shoe having a rear portion embodying a pair of relatively spaced wall portions between which the seeds are deposited in the furrow formed thereby, and a fertilizer-depositing mechanism associated with said planting mechanism and including a fertilizer conduit having its lower end provided with downwardly diverging side members, said side members being provided with forwardly-projecting extensions, the front and top edges thereof fitting said spaced shoe walls and the bottom portion diverging rearwardly from said front edges to the front edges of said side members, said side members and extensions constituting an auxiliary furrow-forming device capable of forming a fertilizer receiving furrow disposed above and wider than said seed-receiving furrow having side walls extending upwardly and inwardly over the bottom of the furrow and normally collapsing to cover said bottom when said auxiliary furrow-forming device is moved away, and means for conducting fertilizer to said fertilizer-receiving furrow above and laterally of said seed-receiving furrow.

HARRY RANDALL TRAPHAGEN.